(12) United States Patent
Shin

(10) Patent No.: US 9,906,697 B2
(45) Date of Patent: Feb. 27, 2018

(54) APPARATUS FOR TAKING CLOSE-UP PICTURE USING MOBILE TERMINAL EQUIPPED WITH CAMERA, AND EXTERIOR OPTICAL MODULE FOR TAKING CLOSE-UP PICTURE

(71) Applicant: Yo Shik Shin, Seoul (KR)

(72) Inventor: Yo Shik Shin, Seoul (KR)

(*) Notice: Subject to any disclaimer, the term of this patent is extended or adjusted under 35 U.S.C. 154(b) by 58 days.

(21) Appl. No.: 15/015,780

(22) Filed: Feb. 4, 2016

(65) Prior Publication Data
US 2017/0085761 A1    Mar. 23, 2017

(30) Foreign Application Priority Data

Sep. 21, 2015    (KR) .................. 10-2015-0133099

(51) Int. Cl.
*H04N 5/225*    (2006.01)
*F21V 8/00*    (2006.01)
(Continued)

(52) U.S. Cl.
CPC .......... *H04N 5/2256* (2013.01); *G02B 6/002* (2013.01); *G02B 6/0016* (2013.01); *G02B 6/0031* (2013.01); *G03B 15/05* (2013.01); *G03B 17/565* (2013.01); *H04N 5/2254* (2013.01); *G03B 2215/056* (2013.01); *G03B 2215/0575* (2013.01); *G03B 2215/0582* (2013.01); *G03B 2215/0592* (2013.01)

(58) Field of Classification Search
CPC .... G03B 17/14; H04N 5/2252; H04N 5/2254; H04N 5/2256
See application file for complete search history.

(56) References Cited

U.S. PATENT DOCUMENTS

2014/0369575 A1* 12/2014 Riopka .............. G06K 9/00046
                                                                382/127
2015/0172522 A1*  6/2015 O'Neill ................ H04N 5/2252
                                                                348/240.3

FOREIGN PATENT DOCUMENTS

JP      11-183974 A      7/1999
JP    2001-255574 A     9/2001
(Continued)

OTHER PUBLICATIONS

Korean Office Action dated Sep. 4, 2016, issued to Korean Application No. 10-2015-0133099.

*Primary Examiner* — Sinh Tran
*Assistant Examiner* — Selam Gebriel
(74) *Attorney, Agent, or Firm* — Stein IP, LLC

(57) ABSTRACT

Provided is an apparatus for taking close-up pictures using a mobile terminal equipped with a camera and an exterior optical module for taking close-up pictures. The exterior optical module according to the present invention is characterized in that it is possible to take close-up pictures of even subjects within the shortest photographing distance of a camera part embedded in a typical mobile terminal, and the light source embedded in the mobile terminal is used without using a separate external light source. By providing an optical zoom through a separate exterior lens, it is possible to apply the present invention in cases where a magnified image is required, such as for the inspection of the skin tissues, in a portable microscope function, or the like. The mobile terminal becomes an apparatus for taking close-up pictures through an exterior optical module mounted thereon.

20 Claims, 5 Drawing Sheets

(51) Int. Cl.
  *G03B 15/05*    (2006.01)
  *G03B 17/56*    (2006.01)

(56)      References Cited

FOREIGN PATENT DOCUMENTS

JP      2004-279733  A    10/2004
KR   10-2004-0071848  A     8/2004
KR   10-2008-0106704  A    12/2008
KR   10-2010-0094076  A     8/2010
KR   10-2014-0004440  A     1/2014
KR       20-0470827  B     1/2014
KR       10-1479609  B1    1/2015

* cited by examiner

APPARATUS FOR TAKING CLOSE-UP PICTURE USING MOBILE TERMINAL EQUIPPED WITH CAMERA, AND EXTERIOR OPTICAL MODULE FOR TAKING CLOSE-UP PICTURE

CROSS-REFERENCE TO RELATED APPLICATIONS

This invention claims priority from Korean Patent Application No. 10-2015-0133099, filed Sep. 21, 2015, in the Korean Intellectual Property Office, the disclosure of which is incorporated herein by reference in its entirely.

BACKGROUND OF THE INVENTION

Field of the Invention

The present invention relates to an apparatus for taking close-up pictures by using a camera and an LED illumination which are embedded in a mobile terminal such as a smart phone, and to an exterior optical module for taking the close-up pictures.

Description of the Related Art

Mobile terminals, such as smart phones and tablet computers, which are widely used recently, are equipped with exposed cameras and LED illumination for taking pictures of external subjects. Users take pictures by only using a camera, or, when an illumination is required, take pictures after controlling an LED to be turned on. Accordingly, the camera and the LED illumination are provided adjacent to each other on one surface of a mobile terminal.

In general, the camera embedded in a mobile terminal has an auto focus (AF) function such that the focal length thereof is changed by changing the distance between an embedded lens and an image sensor. Here, the minimum focal length is set for each camera embedded in the mobile terminal, and the shortest photographing distance is set according to the minimum focal length. When a subject is located within the shortest photographing distance, the subject may not be photographed or an unclear image is obtained because the subject is out of focus.

In order to photograph a subject within the shortest photographing distance, the subject may be photographed at a distance about the minimum focal length with a predetermined optical magnification ratio, and a digital zoom may be used through a digital image processing method. However, in such cases, the image contrast is remarkably decreased and thus the state of the subject can not be well viewed.

Recently, there have been attempts to take a close-up picture of the skin tissue of a user by using a camera embedded in a mobile terminal, for skin care purposes. The shortest photographing distance of embedded cameras in mobile terminals are about 50 mm or more, and the state of skin tissues may not be clearly viewed through the images taken from such a distance even when a digital zoom is applied. In other words, a clearly in-focus and magnified image by achieving a shorter photographing distance to shoot at a closer distance is required.

As the best method for taking close-up pictures, the method in which the camera which itself embedded in a mobile terminal is designed to embed various lenses together therein so as to further decrease the shortest photographing distance may be a fundamental solution. The problem is that such a fundamental solution has not yet been developed, probably due to the effect that the solution has in determining the product price. Most of all, mobile phones developed up to now can not be used to take pictures in such a manner.

Alternatively, a method in which a macro lens is attached to the outside of a mobile terminal may be used. This method photographs the state of the skin by using external light such as natural light or indoor lighting. Accordingly, in this case, close-up pictures are not uniform, and in some cases, it may be impossible to take pictures or the pictures taken may be unsuitable. For example, in the case of a backlight in which an illumination is located at the rear side of a subject, the image of the subject is not well formed because too much amount of light enters the camera. Also, when the surroundings are too dark, it may be impossible to take a picture due to insufficient illumination.

RELATED TECHNICAL DOCUMENTS 1. 1. Camera device of mobile terminal (Korean Patent No. 0575724)

However, in the cited patent invention, an embedded camera has a function to take close-up pictures. However, such a camera embedded in a mobile terminal also has a limit in taking close-up pictures, and thus it is difficult to take a very close picture with a constant optical magnification ratio, and also, since such a means for taking close-up pictures is embedded in a mobile terminal itself, it is difficult to be applied to general cameras.

SUMMARY OF THE INVENTION

Technical Problem

The present invention is provided to solve the above-described problems. An object of the present invention is to provide an apparatus for taking close-up pictures by using a camera and an LED illumination which are embedded in a mobile terminal such as a smart phone, and to an exterior optical module for taking the close-up pictures.

Another object of the present invention is to provide an apparatus that is used for taking close-up pictures of the skin of a user to view the state of the skin tissues, or as a portable microscope, and the like, by using a camera and an LED illumination which are embedded in a mobile terminal.

Technical Solution

To achieve the objects, the present invention provides an exterior optical module mounted on a mobile terminal provided with a camera part and an LED illumination.

The exterior optical module includes a macro lens, a light guide, and a housing. The macro lens is vertically disposed on an optical axis of the camera part to decrease a shortest photographing distance of the camera part. The light guide formed of a transparent material, receives the light emitted from the LED illumination, and emits the received light in the direction of the optical axis through an emitting surface provided on an outer circumference of the macro lens to illuminate a subject at a front side thereof. The housing accommodates the macro lens and the light guide in an inner space part thereof, and is mounted on an outer surface of the mobile terminal.

According to an embodiment, a first through hole may be formed on an upper surface of the housing that is perpendicular to the optical axis such that the light emitted through the emitting surface illuminates the subject, and an image of the subject is incident to the macro lens. Here, a height of the upper surface of the housing may be determined on the basis of a magnification ratio of the subject when the subject contacts the first through hole.

According to an embodiment, the light guide may include an illumination light incident part, an illumination light emitting part, and a reflective plate preventing light that is inside the light guide part from leaking to the outside.

The illumination light incident part is provided over the LED illumination, has a shape of a transparent flat plate, and includes an incident surface formed on a lower surface thereof to receive the light emitted from the LED illumination. The illumination light emitting part is provided on an outer circumference of the macro lens, has a shape of a transparent flat plate, and emits the light transmitted from the illumination light incident part through the emitting surface formed on an upper surface thereof. The reflective plate is formed on an outer surface of the light guide except for the incident surface and the emitting surface. The illumination light incident part and the illumination light emitting part may be integrally provided or separately provided.

According to an embodiment, the illumination light incident part may have an upper surface, which faces the incident surface and is formed to be inclined toward the illumination light emitting part, such that the light entering through the incident surface may be transmitted toward the illumination light emitting part. Further, the illumination light incident part may have at least one side surface which extends from the upper surface thereof and is formed to be inclined toward the illumination light emitting part, such that the light entering through the incident surface may be transmitted toward the illumination light emitting part. Thus, the light emitted from the LED illumination of the mobile terminal to be entered through the incident surface of the light guide may be transmitted to the illumination light emitting part, and then emitted to the subject through the emitting surface of the light guide.

According to an embodiment, the incident surface may be disposed on an outer surface of the mobile terminal and extend a long way along an imaginary center line connecting the camera part with the LED illumination, and may thereby be universally applied to the mobile terminals which have distances between the camera parts and the LED illumination that differ from one another.

According to an embodiment, the incident surface may be preferably provided in an uneven shape such that a ratio of light reflected to the outside to the light emitted from the LED illumination is decreased and the light emitted from the LED illumination is reflected or refracted toward the illumination light incident part For example, the incident surface may be formed in a shape in which a plurality of grooves are arranged in parallel.

According to an embodiment, the emitting surface of the illumination light emitting part may be formed in an uneven surface (much finer uneven surface than the incident surface) such that emitted light is not internally reflected back but is externally emitted. For example, the emitting surface may be sanded, polished, or the like to form an uneven surface. Additionally, the exterior optical module may further include a diffusion plate attached on the emitting surface to allow the light to be uniformly emitted from the emitting surface.

According to an embodiment, the housing may be designed to be detachably mounted on an outer surface of the mobile terminal. For example, the exterior optical module may further include a magnet inside the housing such that the housing is mounted on a metal plate attached to the outer surface of the mobile terminal.

Advantageous Effects

By using an exterior optical module according to the present invention, it is possible to take close-up pictures of subjects even within the shortest photographing distance of a camera part embedded in a typical mobile terminal, and by providing an optical zoon through a separate exterior lens, it is possible to apply the present invention in cases in which a magnified image is required, such as in the inspection of skin tissues or as a portable microscope function.

The exterior optical module according to the present invention may sufficiently illuminate a subject with only the internal light source of a mobile terminal and without an external illumination, by using a light guide which effectively collects the LED illumination embedded in the mobile terminal.

Also, the optical module allows subjects to be illuminated by only using the light emitted from the LED illumination of a mobile terminal, and allows the images of the subjects to be formed on the camera part of the mobile terminal, and thus prevents external natural light, indoor lighting or the like from blurring or interfering with the images of subjects formed on the camera part of the mobile terminal. Thus, users may obtain clearer images than those obtained from using external light, and the operation is much more convenient when compared to the case of using a separate external illumination.

Also, although the distance between a camera and an LED illumination, which are embedded in a mobile terminal, is different for each type of mobile terminal, the light guide of the optical module according to the present invention may be universally applied to mobile terminals that are different from one another to receive the LED illumination.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing of which.

DESCRIPTION OF THE EMBODIMENTS

Hereinafter, exemplary embodiments of the inventive concept will be described in detail with reference to the accompanying drawings.

Figure 1:
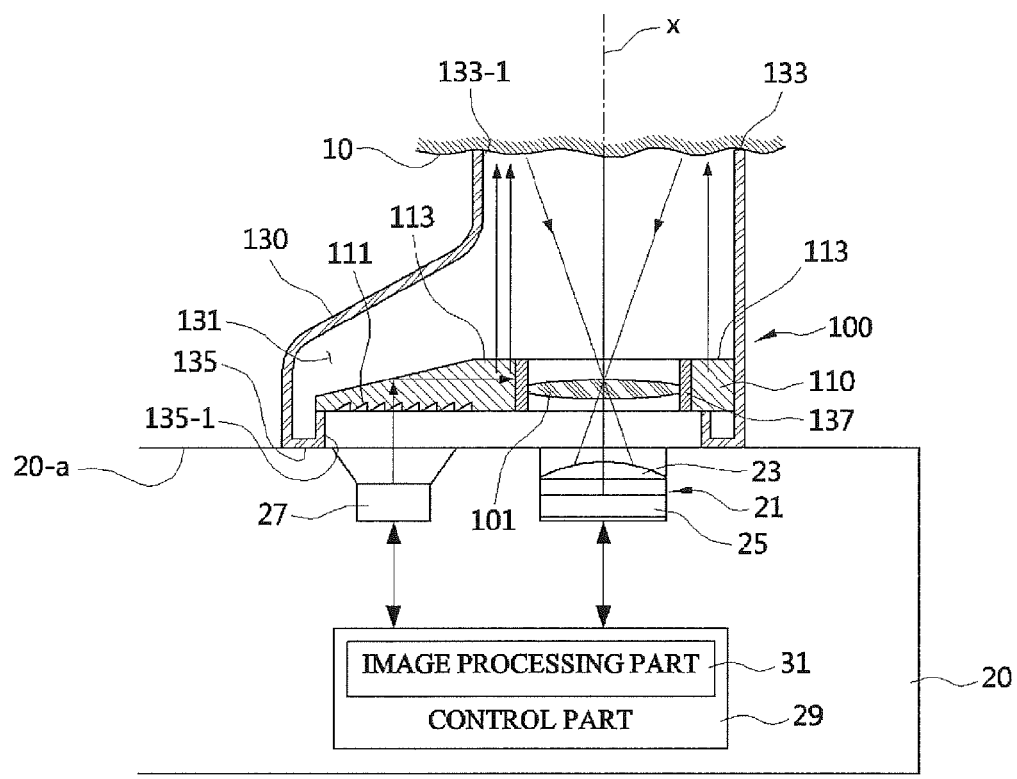
FIG. 1 is a cross-sectional view illustrating a shape of an exterior optical module, according to an embodiment of the present invention, mounted on a mobile terminal.

Referring to FIG. 1, an exterior optical module 100 of the present invention is mounted as an exterior device on a mobile terminal 20 including a camera part 21 and an LED illumination 27, provides a light path between the mobile terminal 20 and a subject 10, and adjusts the shortest photographing distance of the mobile terminal 20. The subject 10 may be any object of which a close-up picture (or magnified picture) can be taken therefrom, and for example, may include the skin of a user.

As described above, the camera part 21 of the mobile terminal 20 includes an embedded lens 23 and an image sensor 25, and has the designed minimum focal length and shortest photographing distance according to the structure and operation mechanism thereof. The exterior optical module 100 of the present invention mounted on such a mobile terminal 20 allows a subject positioned within the shortest photographing distance of the camera part 21 to be focused so as to be photographed and to be photographed with a constant magnification ratio, and provides a sealed light path extending from the LED illumination 27 to the subject 10 and to the camera part 21.

Referring to FIG. 1, the exterior optical module 100 of the present invention includes a macro lens 101, a light guide 110, and a housing 130. Hereinafter, for convenience of description, as long as a specific description is not given, the internal components and the operation of the exterior optical module 100 will be described on the basis of a state in which the exterior optical module 100 is mounted on the mobile terminal 20.

The housing 130 accommodates the macro lens 101 and the light guide 110 in an internal space part 131 thereof. Also, the housing 130 provides a sealed light path extending from the LED illumination 27 to the subject 10, and a sealed light path extending from the subject 10 to the camera part 21 such that external illumination does not enter the light paths, thereby preventing an image from being blurred by a light interference or the like. Also, the housing 130 provides a structure which may be detachably mounted on an outer surface 20-*a* of the mobile terminal 20.

In order to obtain a clear image of the subject, 10 there may be various methods, but in the present invention, the subject 10 is photographed only with the illumination provided by the exterior optical module 100 so as to be free from being interfered by external illumination (for example, natural light or interior lighting). Also, the inner surface of the housing 130 is painted with a black paint such that light is not reflected at the inner surface of the housing 130, and thus only the light directly reflected from the subject 10 may be allowed to be incident to the macro lens 101.

For this, the housing 130 is provided as a sealed structure for blocking the entrance of external light other than the LED illumination 27. However, since the housing 130 functions as a single sealed optical barrel between the mobile terminal 20 and the subject 10, with respect to the drawing, the housing 130 has a pipe structure in which a first through hole 133-1 is formed on an upper surface 133 contacting the subject 10, and a second through hole 135-1 is formed on a lower surface 135 contacting the mobile terminal 20.

Like the macro lens 101, the first through hole 133-1 is also disposed on an imaginary plane perpendicular to the optical axis x of the camera part 21 and disposed such that the optical axis x passes through the center of the first through hole 133-1.

The second through hole 135-1 has the size including the camera part 21 and the LED illumination 27, and the second through hole 135-1 contacts the outer surface 20-*a* of the mobile terminal 20, so that the camera part 21 and the LED illumination 27 meet the inner space part 131 of the housing 130.

While the second through hole 135-1 should cover the camera part 21 and the LED illumination 27, the size of the first through hole 133-1 is determined by an angle of view determined by the macro lens 101 and the camera part 21 and is thus smaller than that of the second through hole 135-1. Accordingly, as exemplarily illustrated in FIG. 1, a pipe shape in which the lower portion thereof is wide and the upper portion thereof is narrow may be defined.

According to embodiments, instead of the second through hole 135-1, two through holes (not shown) corresponding to the camera part 21 and LED illumination 27 may be provided on the lower surface 135 of the housing 130, but such may not be suitable to be universally applied to various mobile terminal models in which the distances between the camera parts 21 and the LED illumination 27 are different from one another.

The light emitted from the LED illumination 27 is incident to the light guide 110 via the second through hole 135-1, and emitted from the light guide 110 to the subject 10 via the first through hole 133-1. The emitted light that is reflected and/or refracted at the subject 10 is incident to the camera part 21 via the first through hole 133-1 and the macro lens 101.

In order to obtain a clear image of the subject 10, the present invention allows the subject 10 to contact the first through hole 133-1 besides blocking external illumination, thereby suggesting users maintain a constant distance between the camera part 21 and the subject 10. These are desirable, for example, when taking a magnified picture of user's skin to view the state of the skin. Since the subject 10 contacts the first through hole 133-1, the constant distance is determined as the height of the first through hole 133-1, that is, the height of the upper surface 133 of the housing.

The height of the first through hole 133-1 should be equal to or greater than a synthesized shortest photographing distance which is the newly adjusted shortest photographing distance as the exterior optical module 100 is mounted. Further, the magnification ratio of the subject should be considered in the case of photographing the subject 10 while the subject is contacting the first through hole 133-1. The closer the position of the subject 10 to the camera part 21, the more magnified the image of the subject 10, and the image may be magnified by disposing the subject 10 closer to the camera part 21 by the amount of decrease in the synthesized shortest photographing distance. Accordingly, in consideration of the magnification ratio according to an optical zoom additionally provided by the macro lens 101, the distance to the subject 10, that is, the height of the housing 130 should be set so as to be suitable for the magnification ratio of the image to be obtained through the exterior optical module 100.

Since the subject 10 does not necessarily contact the first through hole 133-1 in the configuration of the present invention, a user may photograph the subject 10 in a state of being spaced apart from the exterior optical module 100.

The macro lens 101 is vertically disposed on the optical axis x of the camera part 21 to decrease the shortest photographing distance of the camera part 21, thereby decreasing the synthesized shortest photographing distance of the camera part 21.

The macro lens 101 is preferably provided as being inserted into a separate lens barrel 137 to prevent the light emitted from the light guide 110 from directly entering the macro lens 101.

In order to prevent the macro lens 101 from being contaminated, the exterior optical module 100 may further include a protective window (not shown) to cover the upper portion of the lens barrel 137.

The light guide 110 is formed of a transparent material. The light guide 110 is disposed over the LED illumination 27 and the camera part 21 and guides the actual light path between the LED illumination 27 and the subject 10 to illuminate the subject 10.

For this, the light guide 110 includes an illumination light incident part 210, an illumination light emitting part 230, and a reflective plate 115 attached to an outer surface of the light guide. The illumination light incident part 210 and the illumination light emitting part 230 are preferably formed integrally, but may be separately formed.

The illumination light incident part 210 is formed of a transparent material having a shape of an approximately flat plate over the LED illumination 27, and has an incident surface 111 which receives the light emitted from the LED illumination 27 and is disposed on a bottom surface thereof in the drawing.

The illumination light emitting part 230 has a shape of a transparent flat plate disposed along the outer circumference of the macro lens 101, and has an emitting surface 113 from which light is emitted from the upper surface thereof. The illumination light emitting part 230 emits the light, which is received from the illumination light incident part 210, through the emitting surface 113 to illuminate the subject 10 contacting the first through hole 133-1. Accordingly, the first through hole 133-1 preferably has an area equal to or greater than that of the emitting surface 113.

Hereinafter, the light guide 110 will be described again with reference to FIGS. 2 and 3.

<Light Guide>

Figure 2:
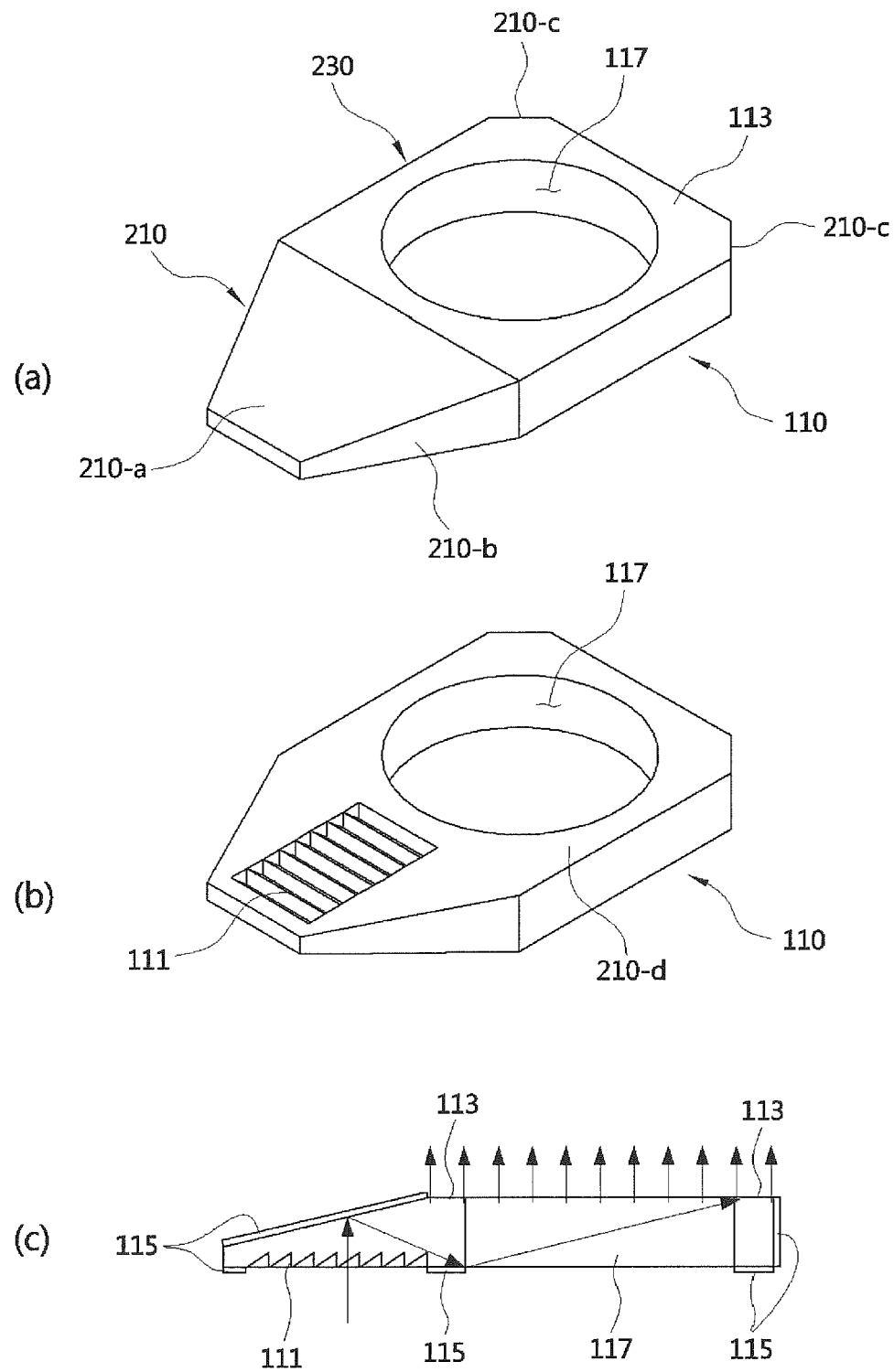
FIG. 2 is a perspective view illustrating a light guide according to an embodiment of the inventive concept.
Figure 3:
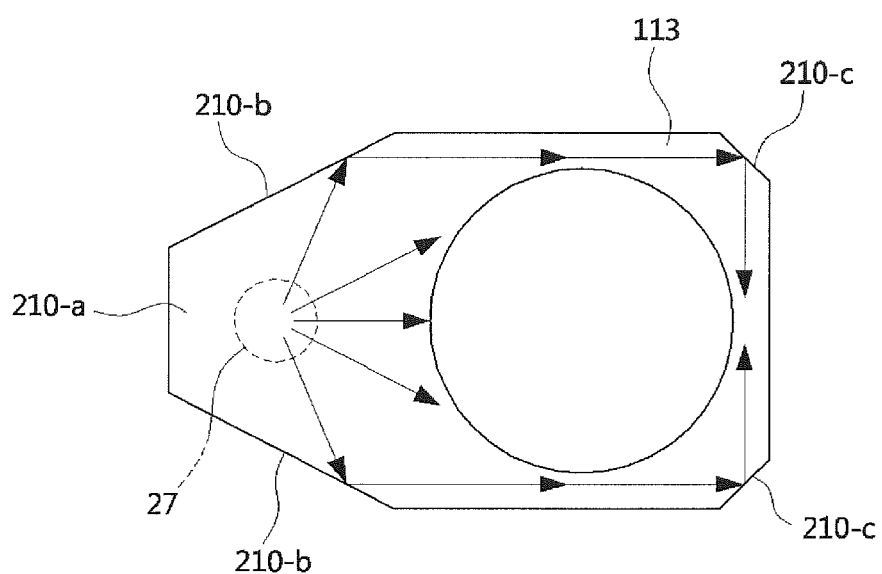
FIG. 3 is a plan view of the light guide of FIG. 2.

A light guide 110 illustrated in FIGS. 2 and 3 is an example in which an illumination light incident part 210 and an illumination light emitting part 230 are integrally provided, and has a shape of a single transparent flat plate. As described below, a lens hole 117 for disposing a macro lens 101 is formed at the center of the region of the illumination light emitting part 230. A reflective plate 115 is attached to the outer surface except for an incident surface 111 and an emitting surface 113.

The illumination light incident part 210 may basically have a flat plate shape, but is preferably formed in a shape such as the following to transmit the light, which is received from an LED illumination 27 through the incident surface 111, to the illumination light emitting part 230.

Firstly, as illustrated in FIG. 2, an upper surface 210-a which faces the incident surface 111 in the illumination light incident part is formed to be inclined toward the illumination light emitting part 230 such that the light entering through the incident surface 111 is reflected at the upper surface 210-a of the illumination light incident part to be transmitted to a front side of the lens hole 117 of illumination light emitting part 230.

Secondly, with respect to the plain view of FIG. 3, four edges 210-b and 210-c of the light guide 110 are slantly cut such that the light entering through the incident surface 111 is reflected at the two edges 210-b in the side of the illumination light incident part 210 to be transmitted to both rear sides of the lens hole 117, and the two edges 210-c in the side of the illumination light emitting part 230 reflect again the light transmitted to both the rear sides of the lens hole 117 to the rear central side of the lens hole 117. Through this structure, the light uniformly transmitted to the surroundings of the lens hole 117 of the illumination light emitting part 230 may uniformly illuminate the entire first through hole 133-1 through the emitting surface 113 while being reflected again at a rear surface 210-d of the light guide 110.

Thirdly, the reflective plate 115 for reflecting the light to the inside of the light guide 110 is attached to the upper surface 210-a of the illumination light incident part, to the four edges 210-b and 210-c of the light guide 110, and to the rear surface 210-d of the light guide 110.

Finally, the incident surface 111 is formed in an uneven shape which is not flat such that the ratio of the light emitted from the LED illumination 27 that is totally reflected (or reflected) externally at the incident surface 111 is reduced and the light emitted from the LED illumination 27 is made to be reflected or refracted toward the interior of the illumination light incident part 210. Preferably, as illustrated in FIG. 2, the incident surface 111 is formed in a shape in which a plurality of grooves formed in straight lines are arranged in parallel. The directions of the grooves illustrated in FIG. 2 are perpendicular to the direction toward the illumination light emitting part 230, but not necessarily limited thereto.

Also, considering that the distance between the camera part 21 and the LED illumination 27 differs for each model of the typical mobile terminals 20, the incident surface 111 extends a long way in a longitudinal direction along an imaginary center line on the outer surface 20-a of the mobile terminal 20, thereby being universally applied to the mobile terminals that differ from one another.

Since the illumination light emitting part 230 is provided on the outer circumference of the macro lens 101, the light guide 110 has the lens hole 117 for disposing the macro lens 101 at the center of the region of the illumination light emitting part 230 with respect to the basic shape of a rectangular plate. Accordingly, the emitting surface 113 on the upper surface of the illumination light emitting part 230 is provided along the circumference of the macro lens 101.

However, according to another embodiment, the illumination light emitting part 230 may not be provided to the entire circumference of the macro lens 101 as illustrated in FIG. 2, but may be provided only to a portion of the circumference of the macro lens 101.

The emitting surface 113 is preferably formed as an uneven surface of a predetermined degree such that the light in the illumination light emitting part 230 is not internally reflected again at the emitting surface 113 but is externally emitted, and of course, the unevenness of the emitting surface 113 is much smaller than that of the incident surface 111. For example, the emitting surface 113 may be sanded, polished, or the like. In addition, in order to uniformly emit the light from the emitting surface 113, a diffusion plate (not shown) may be attached to the uneven emitting surface 113.

<Attaching and Detaching Exterior Optical Module>

The method for attaching and detaching an exterior optical module 100 to or from an outer surface 20-a of the mobile terminal 20 may be implemented in various ways.

Figure 4:
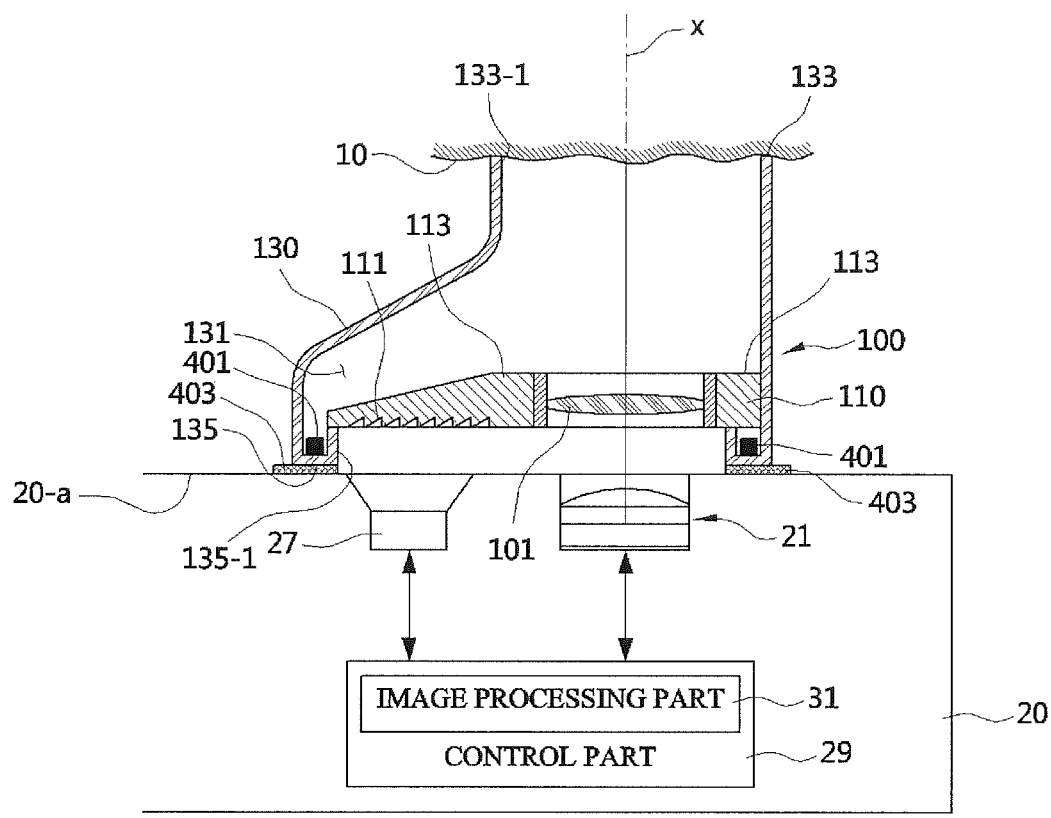
FIG. 4 is a cross-sectional view illustrating a method for mounting an exterior optical module according to an embodiment of the present invention.

For example, as illustrated in FIG. 4, an exterior optical module 100 may further include a magnet 401 which is disposed at a lower end of an inner space part 131 of a housing 130, and a metal plate 403 may be attached to an outer surface 20-a of a mobile terminal 20 by using a separate adhesive. The shape and attached position of the metal plate 403 are determined by the shape of a lower surface 135 and the attached position of the exterior optical module 100. When the exterior optical module 100 approaches the metal plate 403 of the mobile terminal 20, the magnet 401 in the exterior optical module 100 is coupled to the metal plate 403, so that the exterior optical module 100 is mounted on the mobile terminal 20.

Here, a plurality of holes (not shown) are provided on the lower surface 135 of the exterior optical module 100, and a plurality of protrusions (not shown) which are fitted into the plurality of holes are provided on the metal plate 403 such that the attached position may not be dislocated. Of course, on the contrary, a plurality of protrusions (not shown) may be provided on the lower surface 135 of the exterior optical module 100, and a plurality of holes (not shown) which are fitted into the plurality of protrusions may be provided on the metal plate 403.

Figure 5:
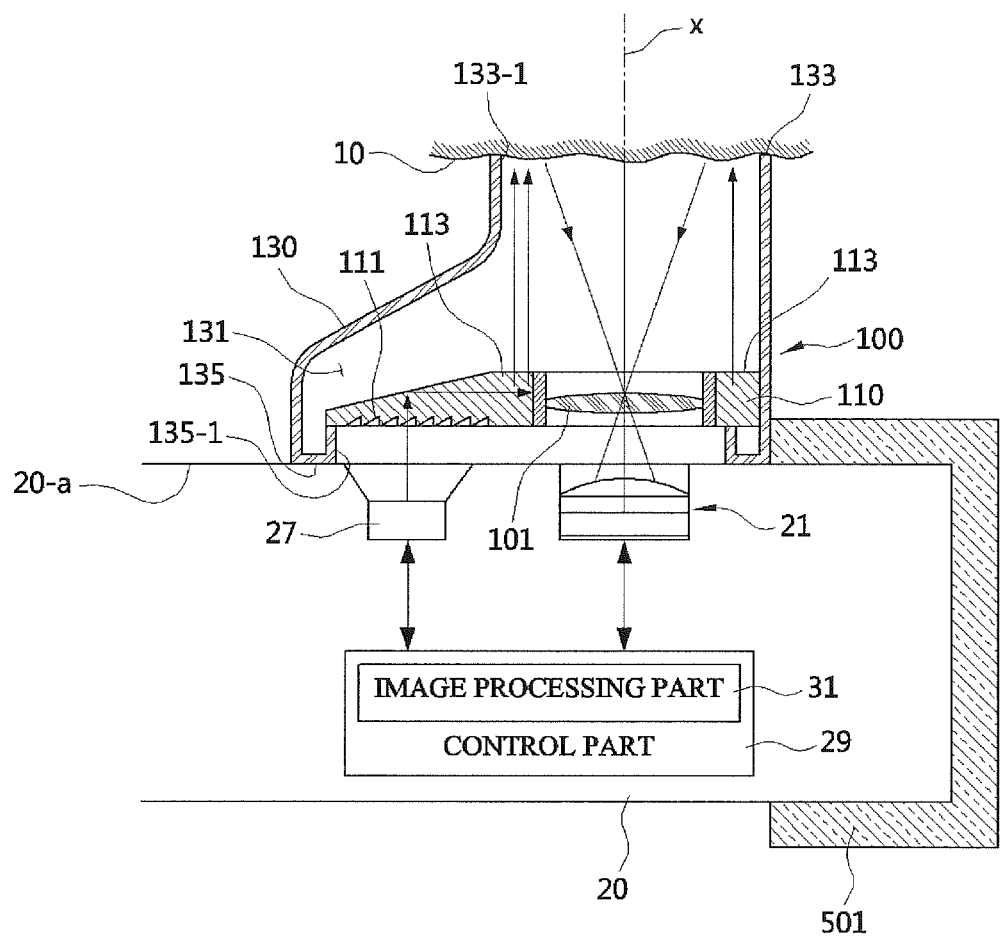
FIG. 5 is a cross-sectional view illustrating a method for mounting an exterior optical module according to another embodiment of the present invention.

Alternatively, as illustrated in FIG. 5, an exterior optical module 100 further includes a hooking member 501 extending from a housing 130 such that the hooking member 501 is inserted into one end of a mobile terminal 20 to be mounted, so that the exterior optical module 100 may be mounted to the mobile terminal.

<Apparatus for Taking Close-Up Pictures in which a Mobile Terminal and an Exterior Optical Module are Coupled, and Operation Thereof>

A mobile terminal 20 includes a control part 29 besides a camera part 21 and an LED illumination 27. Further, the mobile terminal 20 may include, of course, a configuration related to the main function thereof. But such a configuration and a function are not essential to the present invention and do not contribute to the description of the present invention, and thus will neither be illustrated in the drawings nor will descriptions thereof be given.

The control part 29 includes an image processing part 31 which controls the entire process of taking close-up pictures of the subject 10 by using the LED illumination 27 and the camera part 21.

The control part 29 may be understood as an especially provided configuration for the present invention, but may also be a configuration provided to perform major functions of the mobile terminal 20 itself. As such, when the control part 29 is the basic configuration provided for performing the major functions of the mobile terminal 20, the control part 29 may functionally command a functional configuration that is implemented by a processor chip, which is a fundamentally included hardware of the mobile terminal 20, and an application, which is a software processed by the chip. Here, the application is the software that is stored in a programming language and interpreted by a computer to process the designated sequence of instructions.

In this case, the image processing part 31 may be one kind of such application, and may be a program or an aggregate of a plurality of programs installed to be executed by the processor chip in order to implement the present invention.

Specifically, the image processing part 31 controls the LED illumination 27 to emit the light for taking pictures of the subject 10, and then displays the image generated from the camera part 21 through a display part (not shown). One of the differences between the image processing part 31 of the present invention and typical camera photographing applications is that the LED illumination 27 is turned on even when it is not the instant at which the camera part 21 is capturing the image.

<Description of Operation>

The image processing part 31 controls the LED illumination 27 to be turned on to take close-up pictures of the subject 10 according to the control of a user, and controls the camera part 21 to generate a digital image.

The light emitted from the LED illumination 27 is incident to the light guide 110 through the incident surface 111, and is then emitted toward the first through hole 133-1 through the emitting surface 113 of the illumination light emitting part 230 while being reflected or refracted inside of the light guide 110. Since the subject 10 is in the state of contacting the first through hole 133-1, the light emitted from the emitting surface 113 illuminates the subject 10, and accordingly, the light (image) reflected or refracted at the subject 10 is again incident to the macro lens 101. The image passing through the macro lens 101 is incident to the camera part 21 and is formed on the image sensor 25. The image formed on the image sensor 25 is displayed through a display part (not shown).

In this process, the light entering through the incident surface 111 is not emitted to the outside of the light guide 110 but is emitted only through the emitting surface 113 such that the subject 10 may be sufficiently illuminated. Since the exterior optical module 100 has a sealed barrel structure, external natural light, indoor lighting or the like does not enter the inside of the exterior optical module 100, and thus does not blur or interfere with an image incident to the macro lens 101 from the subject 10. Further, since the macro lens 101 is also positioned inside the separate lens barrel 137, the light emitted from the emitting surface 113 does not directly enter the macro lens 101, and thus does not blur or interfere with an image incident to the macro lens 101.

Furthermore, although preferred embodiments are illustrated and described above, the specification is not limited to a specific embodiment mentioned above. Various modifications are possible by those skilled in the art without departing from the spirit and scope of the claims. Also, such modifications should not be understood separately from the spirit and scope of the inventive concept.

The invention claimed is:

1. An exterior optical module mounted on an outer surface of a mobile terminal provided with an LED illumination and a camera part on the outer surface of the mobile terminal, the exterior optical module comprising:
   a macro lens vertically disposed on an optical axis of the camera part to decrease a shortest photographing distance of the camera part;
   a light guide formed of a transparent material, receiving the light emitted from the LED illumination, and emitting the received light in the direction of the optical axis of the camera part through an emitting surface provided on an outer circumference of the macro lens to illuminate a subject at a front side thereof; and
   a housing accommodating the macro lens and the light guide in an inner space part thereof, and mounted on the outer surface of the mobile terminal,
   wherein the light guide comprises:
   a transparent illumination light incident part provided over the LED illumination, having a shape of a flat plate, and including an incident surface formed on a lower surface thereof to receive the light emitted from the LED illumination;
   a transparent illumination light emitting part provided on an outer circumference of the macro lens, having a shape of a flat plate, and emitting the light transmitted from the illumination light incident part through the emitting surface formed on the upper surface thereof; and
   a reflective plate covering an outer surface of the light guide except for the incident surface and the emitting surface to prevent light that is inside the illumination light incident part and the illumination light emitting part from leaking to the outside.

2. The exterior optical module of claim 1, wherein the housing comprises a first through hole which is formed on an upper surface of the housing that is perpendicular to the optical axis such that the light emitted through the emitting surface illuminates the subject, and an image of the subject is incident to the macro lens, wherein a height of the upper surface of the housing is determined on the basis of a magnification ratio of the subject when the subject contacts the first through hole.

3. The exterior optical module of claim 1, wherein the illumination light incident part and the illumination light emitting part are integrally provided.

4. The exterior optical module of claim 1, wherein the illumination light incident part has an upper surface which faces the incident surface and is formed to be inclined toward the illumination light emitting part such that the light entering through the incident surface is transmitted toward the illumination light emitting part.

5. The exterior optical module of claim 3, wherein the illumination light incident part has at least one side surface which extends from the upper surface thereof and is formed to be inclined toward the illumination light emitting part such that the light entering through the incident surface is transmitted toward the illumination light emitting part.

6. The exterior optical module of claim 1, wherein the incident surface is disposed on an outer surface of the mobile terminal and extends a long way along an imaginary center line connecting the camera part with the LED illumination.

7. The exterior optical module of claim 6, wherein the incident surface is provided in an uneven shape such that a ratio of light reflected to the outside to the light emitted from the LED illumination is decreased, and the light emitted from the LED illumination is reflected or refracted toward the illumination light incident part.

8. The exterior optical module of claim 7, wherein the incident surface is formed in a shape in which a plurality of grooves are arranged in parallel.

9. The exterior optical module of claim 1, wherein the emitting surface of the illumination light emitting part is formed as an uneven surface such that emitted light is not internally reflected again but is externally emitted.

10. The exterior optical module of claim 9 further comprising a diffusion plate attached on the emitting surface to allow the light to be uniformly emitted from the emitting surface.

11. The exterior optical module of claim 1, wherein the housing is detachably mounted on an outer surface of the mobile terminal.

12. The exterior optical module of claim 11 further comprising a magnet inside the housing, wherein the housing is mounted on a metal plate attached to the outer surface of the mobile terminal.

13. An apparatus for taking close-up pictures, comprising:
the mobile terminal and
the exterior optical module as set forth in claim 1.

14. An apparatus for taking close-up pictures, comprising: the mobile terminal and the exterior optical module as set forth in claim 2.

15. An apparatus for taking close-up pictures, comprising: the mobile terminal and the exterior optical module as set forth in claim 3.

16. An apparatus for taking close-up pictures, comprising: the mobile terminal and the exterior optical module as set forth in claim 4.

17. An apparatus for taking close-up pictures, comprising: the mobile terminal and the exterior optical module as set forth in claim 5.

18. An apparatus for taking close-up pictures, comprising: the mobile terminal and the exterior optical module as set forth in claim 6.

19. An apparatus for taking close-up pictures, comprising: the mobile terminal and the exterior optical module as set forth in claim 7.

20. An apparatus for taking close-up pictures, comprising: the mobile terminal and the exterior optical module as set forth in claim 8.

* * * * *